US009930870B2

United States Patent
Lee

(10) Patent No.: US 9,930,870 B2
(45) Date of Patent: Apr. 3, 2018

(54) METHOD FOR INDUCING ARTIFICIAL OVULATION AND SPAWNING OF FRESH-WATER EELS

(71) Applicant: GOOGOL HOLDINGS CO., LTD, Gangwon-do (KR)

(72) Inventor: Soung Ho Lee, Seoul (KR)

(73) Assignee: GOOGOL HOLDINGS CO., LTD, Gangwon-Do (KR)

( * ) Notice: Subject to any disclaimer, the term of this patent is extended or adjusted under 35 U.S.C. 154(b) by 26 days.

(21) Appl. No.: 14/898,691

(22) PCT Filed: Jun. 13, 2014

(86) PCT No.: PCT/KR2014/005206
§ 371 (c)(1),
(2) Date: Dec. 15, 2015

(87) PCT Pub. No.: WO2014/200305
PCT Pub. Date: Dec. 18, 2014

(65) Prior Publication Data
US 2016/0135436 A1 May 19, 2016

(30) Foreign Application Priority Data
Jun. 15, 2013 (KR) ........................ 10-2013-0068687

(51) Int. Cl.
*A01K 61/00* (2017.01)
*A01K 61/17* (2017.01)

(52) U.S. Cl.
CPC ............ *A01K 61/008* (2013.01); *A01K 61/00* (2013.01); *A01K 61/17* (2017.01)

(58) Field of Classification Search
CPC ....... A01K 61/00; A01K 61/008; A01K 61/17
(Continued)

(56) References Cited

U.S. PATENT DOCUMENTS 3,741,158 A * 6/1973 Moe, Jr. ................. A01K 61/17
                                               119/217
3,916,832 A * 11/1975 Sweeney ................ A01K 61/00
                                               119/212
(Continued)

FOREIGN PATENT DOCUMENTS

CN       102511424 A * 6/2012
CN       102511424 A   6/2012
(Continued)

OTHER PUBLICATIONS

International Search Report dated Oct. 27, 2014 issued on PCT Patent Application No. PCT/KR2014/005206 dated Jun. 13, 2014, Korean Intellectual Property Office.
(Continued)

*Primary Examiner* — Monica L Williams
*Assistant Examiner* — Brady W Frazier
(74) *Attorney, Agent, or Firm* — Mannava & Kang, P.C.

(57) ABSTRACT

According to an example, artificial ovulation and spawning of freshwater eels may be induced to promote artificial ovulation without employing intraperitoneal injection, by feeding a feminization-inducing material (e.g., 17β-estradiol) for inducing feminization during a predetermined period into a raising bath in which broodfish are raised and, when an ovulation induction period arrives, adding pituitary extracts of catadromous fish as an artificial ovulation-promoting substance to the bath. Raising water of the raising bath may be prepared by selectively setting fresh water, brackish water and seawater conditions, a feminization-inducing material for inducing complete feminization of broodfish of the freshwater eels is fed to the raising bath, including the raising water under a fresh water condition, and pre-treatment for feminization is performed. Subsequently, the raising water is set to a seawater condition and
(Continued)

the ovulation-inducing substance is fed to the raising water, thereby inducing ovulation and spawning of the broodfish.

16 Claims, 2 Drawing Sheets

(58) Field of Classification Search
USPC .......................................... 119/215, 217, 218
See application file for complete search history.

(56) References Cited

U.S. PATENT DOCUMENTS

| | | | |
|---|---|---|---|
| 2002/0152968 A1* | 10/2002 | Harris, Jr. ............... | A23K 50/80 119/230 |
| 2008/0271680 A1* | 11/2008 | Burback ................. | A01K 61/00 119/217 |
| 2011/0132271 A1* | 6/2011 | Slembrouck ........... | A01K 61/00 119/218 |
| 2012/0055412 A1* | 3/2012 | Chen ...................... | A01K 61/80 119/230 |

FOREIGN PATENT DOCUMENTS

| | | | |
|---|---|---|---|
| JP | 2008-154459 A | | 7/2008 |
| JP | 2008154459 A | * | 7/2008 |
| KR | 10-1996-0033249 A | | 10/1996 |
| KR | 1019960033249 A | | 10/1996 |
| KR | 10-2008-0020810 A | | 3/2008 |
| KR | 1020080020810 A | | 3/2008 |

OTHER PUBLICATIONS

Satoh, et al., Sex Control of the Japanese Eel by an Estrogen (DES-Na) in Feed, Nippon Suisan Gakkaishi, 1992, vol. 58, No. 7, pp. 1211-1218.

Kim, et al., "Plasma Sex Steroid Hormone Profiles in Artificially Maturing Wild Eel, *Anguilla japonica*", Journal of Aquaculture, 2006, vol. 19, No. 4, pp. 267-274, Korea.

International Preliminary Report on Patentability dated Dec. 23, 2015, issued on PCT Patent Application No. PCT/KR2014/005206 filed Jun. 13, 2014, The International Bureau of WIPO.

Satoh, Hideo et al., "Sex Control of the Japanese Eel by an Estrogen (DES-Na) in Feed", Nippoin Suisan Gakkaishi, 1992, vol. 58, No. 7, pp. 1211-1218.

Kim, Dae-Jung et al., "Plasma Sex Steroid Hormone Profiles in Artificially Maturing Wild Eel, *Anguilla japonica*", Journal of Aquaculture, 2006, vol. 19, No. 4, pp. 267-274.

Palstra et al., "Temporal expression of hepatic estrogen receptor 1, vitellogenin1 and vitellogenin2 in European silver eel", Elsevier Inc., 2009, 12 pages.

Zhang et al., "Histological study on artificial induction of gonadal development in Japanese ell *Anguilla japonica*", Journey of Fishery Sciences of China, vol. 14, No. Jul. 2007, pp. 593-601. English language version at the end of the document.

* cited by examiner

METHOD FOR INDUCING ARTIFICIAL OVULATION AND SPAWNING OF FRESH-WATER EELS

TECHNICAL FIELD

The present invention relates to a method for inducing artificial ovulation and spawning of freshwater eels, and more particularly to a method for inducing artificial ovulation and spawning of freshwater eels so as to induce artificial ovulation in a bath for raising freshwater eels, including raising water to which a feminization-inducing material and an ovulation-inducing substance extracted from flathead mullets as catadromous fish similar to freshwater eels are sequentially added in proper amounts.

CLAIM FOR PRIORITY

The present application is a national stage filing under 35 U.S.C. § 371 of PCT application number PCT/KR2014/005206, having an international filing date of Jun. 13, 2014, which claims priority to Korean patent application number 10-2013-0068687, having a filing date of Jun. 15, 2013, the disclosures of which are hereby incorporated by reference in their entireties.

BACKGROUND ART

In the case of Japanese freshwater eels raised in an artificial feeding environment, gonadotropin hormone (GTH) synthesis ability of the pituitary gland is insufficient and thus the gonads do not develop (Nagahania and Yamamoto, 1973). Such glycoprotein-type GTH is essential for gonad formation and development of fish and vertebrates (Kumar et al., 1997; and Ma et al., 2004).

In this regard, it was reported that, in the case of female freshwater eels, vitellogenesis was completed by repeatedly injecting a salmon pituitary extract (SPE) as a kind of exogenous GTH into the peritoneal cavity, and $17\alpha, 20\beta$-dihydroxyprogesterone (DHP) induced final maturation and ovulation (Yamamoto and Yamauchi, 1974; Ohta et al., 1996; and Adachi et al., 2003), and, in the case of male freshwater eels, spermatin was induced by repeatedly injecting human chorionic gonadotropin (HCG) into blood.

Here, referring to results for artificial ovulation induction of freshwater eels, SPE injection frequency depends upon SPE injection time. Such a result may occur by different GTH reactivity for the ovary according to seasons and a reproduction rate (ovulation rate, fertilization rate and hatching rate) due to the difference.

Furthermore, when SPE is repeatedly added to broodfish of freshwater eels so as to induce artificial ovulation, an administration amount for each individual becomes excessive or deficient. As a result, quality of artificially ovulated ovaries is affected.

In addition, salmon are anadromous fish whereas freshwater eels are catadromous fish. Accordingly, salmon moves to fresh water for spawning whereas freshwater eels move to seawater for spawning, whereby salmon and freshwater eel exhibit completely different ecological characteristics. Since species specificity of fish such as freshwater eels is not greatly unique, a pituitary gland extract (SPE) from salmon is used to promote ovulation. However, there is a need for research into a method of applying a pituitary extract from flathead mullets having ecological characteristics similar to freshwater eels so as to promote ovulation and spawning under ovulation and spawning conditions set similarly to the natural environment.

DISCLOSURE

Technical Problem

Therefore, the present invention has been made in view of the above problems, and it is an object of the present invention to provide a method for inducing artificial ovulation and spawning of freshwater eels, wherein a feminization inducing material (e.g., $17\beta$-estradiol) for inducing feminization is fed to a culture bath in which broodfish as an object of artificial ovulation are cultured, for a predetermined period of time, and when the ovulation induction period arrives, flathead mullet pituitary extract (FPE) of flathead mullet, which are fish in rivers and broad streams, as an ovulation inducing agent, is added to the culture bath, thereby promoting artificial ovulation even without employing intraperitoneal injection.

Technical Solution

In accordance with an aspect of the present invention, the above and other objects can be accomplished by the provision of a method of inducing artificial ovulation and spawning of broodfish of freshwater eels in a raising bath, the method including: controlling such that fresh water, brackish water and seawater are sequentially supplied to the raising bath, inducing feminization and ovary maturation of the broodfish by feeding a feminization-inducing material into the raising bath under a fresh water condition, performing osmoregulation of the broodfish by setting raising water in the raising bath to a brackish water condition after the inducing, feeding an ovulation induction material collected from catadromous fish to the raising water so as to induce ovulation of the broodfish while setting the raising water in the raising bath to a seawater condition, after the performing, and inducing natural spawning after the feeding.

The feminization inducing material may be $17\beta$-estradiol.

In the inducing, temperature of the raising water may be gradually increased from 20° C. to 26° C.

Light may be turned on per predetermined lighting cycle while increasing the water temperature.

The lighting cycle may be 8 to 10 hours.

The inducing may be performed for three to six weeks.

The ovulation-inducing substance for inducing the artificial ovulation may be extracted from flathead mullet as catadromous fish.

A salt concentration may be constantly increased by supplying seawater or brine to the raising bath when supply of the fresh water is stopped.

In the feeding and the inducing natural spawning, temperature of the raising water may be gradually decreased.

In the feeding and the inducing natural spawning, temperature of the raising water may be gradually decreased from 20±0.5° C. to 16 to 17° C.

Each process of the method may be performed in a raising bath apparatus, the raising bath apparatus may include a raising bath, a heater including a heater installed therein so as to provide high-temperature raising water to the raising bath, a cooling unit for supplying low-temperature raising water to the raising bath, a light source installed in the raising bath to periodically turn on light, and a controller for controlling temperature of the raising water and light.

A light shade for shading natural light may be installed at an upper part of the raising bath, and the light source may be disposed under the light shade.

The light source may illuminate blue light having a wavelength of 400 to 500 nm.

An illumination intensity of the light source may be 150 to 200 lux.

The raising bath apparatus further includes a heater driver for driving the heater, a lighting driver for driving the light source, a condition setting unit including a water temperature setting button and a light condition setting button, a controlling-data storage unit for storing temperature change cycle data and light irradiation cycle data, and a clocking unit for providing clocking data so as to control temperature change and a light irradiation cycle of the raising water, wherein the temperature change cycle data and the light irradiation cycle data may be respectively set by the water temperature setting button and the light condition setting button.

A water temperature detection sensor for detecting temperature of raising water and providing information for the temperature to the controller may be installed inside the raising bath.

Advantageous Effects

According to a method for inducing artificial ovulation and spawning of freshwater eels of the present invention, an ovulation period may be shortened by setting raising water in a raising bath to fresh water, brackish water, and seawater conditions and setting a light irradiation period in order to induce sexual maturation and ovulation of broodfish of freshwater eels.

Furthermore, artificial ovulation and spawning is induced, without direct injection, by permitting osmoregulation via a brackish water zone after primarily adding a feminization-inducing material to the raising bath as pre-treatment in order to induce complete feminization of broodfish, and then setting a seawater condition and feeding an artificial ovulation-inducing substance, which is extracted from flathead mullet having ecological migration characteristics similar to those of broodfish of freshwater eels, to the raising water. Accordingly, stressful oocyte quality deterioration in the broodfish may be greatly prevented.

DESCRIPTION OF SYMBOLS

10: RAISING BATH, 14 LIGHT SHADE,
16: CONDITION SETTING UNIT, 18: CONTROLLER,
20: CONTROLLING-DATA STORAGE UNIT, 22: CLOCKING UNIT,
24: HEATER, 26: HEATER DRIVER,
28: COOLING UNIT, 30: LIGHT SOURCE.

BEST MODE

Hereinafter, the present invention is described in detail with reference to the accompanying drawings.

First, according to a preferred embodiment of the present invention, a feminization induction material (e.g., 17β-estradiol) is fed to a raising bath (fresh water as raising water) in which broodfish of freshwater eels (e.g., females) are raised, for a predetermined period.

That is, cultured freshwater eels are masculinized for an unclear reason in many cases and thus a pre-treatment process of inducing feminization of broodfish are required to secure female broodfish.

Accordingly, a feminization induction material is fed to the raising water in the raising bath for a predetermined period (e.g., three to six weeks).

According to the present invention, a feed including a feminization-inducing material is fed to secure broodfish to be subjected to artificial ovulation induction.

When female broodfish are secured according to the pre-treatment process, the female broodfish are raised in a brackish water zone for a predetermined period. So as to prepare the brackish water, the amount of seawater added to corresponding raising water is increased by 5 psu per day to be adapted to seawater through osmotic action.

After broodfish of freshwater eels are completely adapted to seawater as raising water, a flathead mullet pituitary extract (FPE) for inducing artificial ovulation is added to the seawater as raising water. The amount of the FPE is gradually increased by 20 to 120 mg based on 1 kg of raising water every day.

Here, during the artificial ovulation induction process according to the present invention, the temperature of the raising water at 20±0.5° C. is decreased to 16 to 17° C. The temperature of the raising water is increased by 35 psu at each of fresh water, brackish water, and seawater steps, thereby being controlled similarly to natural freshwater eel spawning conditions.

In addition, from a time point at which the feminization-inducing material is added to a time point at which artificial ovulation is induced, a light source is provided to a corresponding raising bath and a lighting cycle of the light source is set such that the lighting cycle is switched faster than once per day in a state in which the sunlight is shaded (e.g., 8 to 10 hours). Preferably, the light is completely turned off at a time point of day 15 to induce natural spawning.

Figure 1:
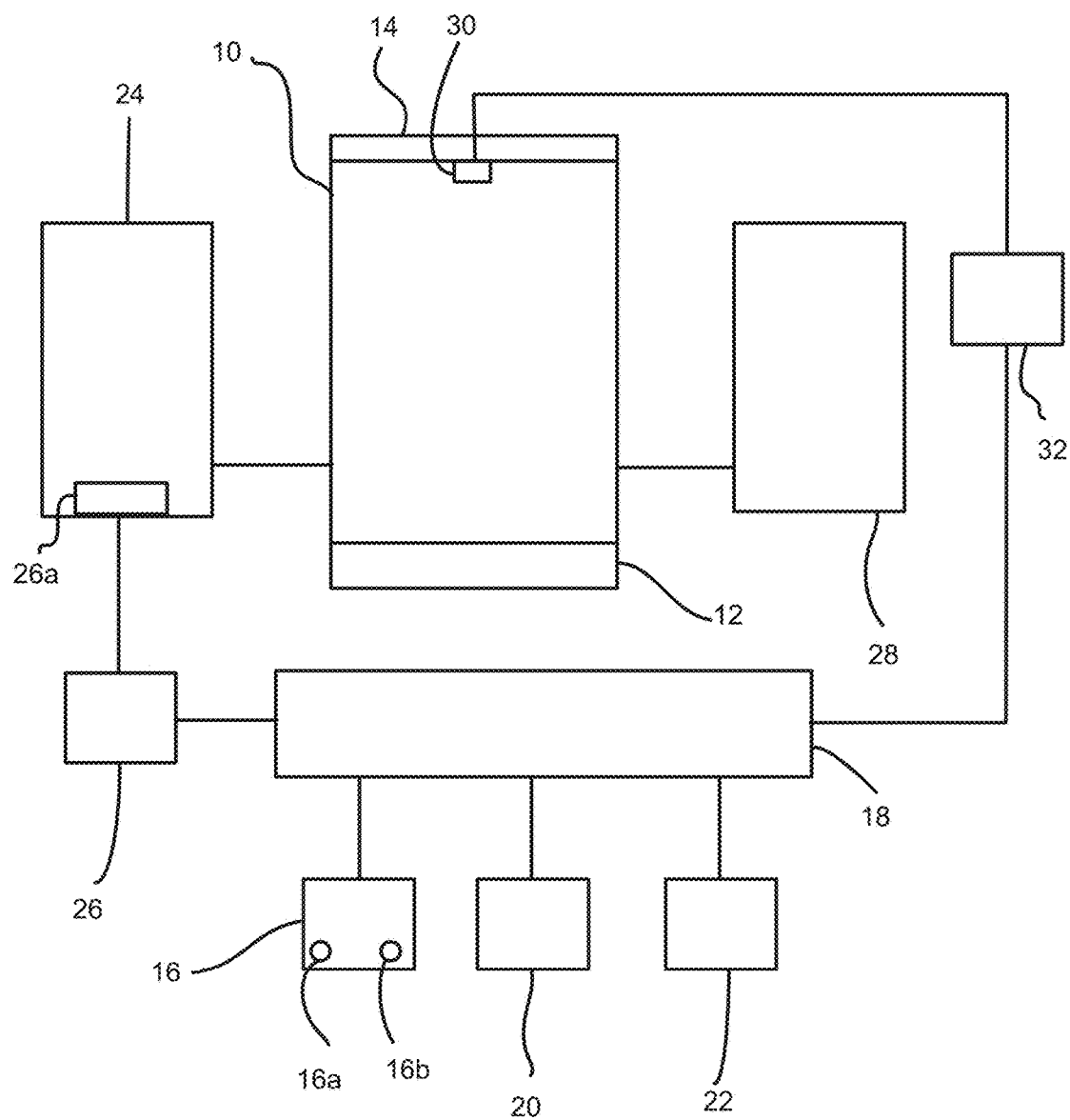
FIG. 1 illustrates a raising bath apparatus for inducing ovulation of freshwater eels according to the present invention.

FIG. 1 illustrates a raising bath apparatus for inducing ovulation of freshwater eels. The raising bath apparatus electronically controls conditions of fresh water, brackish water and seawater, and, additionally, water temperature and a lighting cycle of a light source.

That is, referring to figures, a member number "10" indicates a raising bath that is made of transparent synthetic resin or a glass material and contains broodfish of freshwater eels. A lower part of a raising bath 10 is stably supported by a supporter, and a light shade 14 for shading natural light is installed at an upper part of the raising bath 10.

According to the present invention, a condition setting unit 16 is provided to set a temperature change cycle of raising water supplied to the raising bath 10 and a periodic irradiation condition of light described below. Accordingly, the condition setting unit 16 includes an up/down-type water temperature setting button 16a for setting a temperature change cycle of the raising water and an up/down-type light condition setting button 16b for setting a periodic irradiation condition of the light.

A controller 18 controls overall operation of the raising apparatus, temperature change of the raising water, and a light irradiation cycle. The temperature change and light irradiation cycle are controlled according to a temperature change cycle and a light irradiation cycle which are set by the water temperature setting button 16a and the light condition setting button 16b of the condition setting unit 16.

The controller 18 is connected to a controlling-data storage unit 20, in which temperature change cycle data and light irradiation cycle data set by the water temperature setting button 16a and the light condition setting button 16b of the condition setting unit 16 are stored, and a clocking unit 22 for providing clocking data so as to control temperature change and a light irradiation cycle of the raising water.

In addition, a heating unit 24 includes a heater 26a installed therein so as to provide high-temperature raising water to the raising bath 10 depending upon the temperature change condition. The heater 26a elevates the temperature of the raising water via the heater driver 26, activity of which is controlled by the controller 18.

A cooling unit 28 supplies cool raising water to the raising bath 10 such that low-temperature raising water is supplied depending upon the temperature change condition.

In addition, as an example of a light source 30 disposed at a lower part of the light shade 14, an LED lamp is applied such that blue light having a specific wavelength (i.e., 400 to 500 nm) may be illuminated. On/off of the light source 30 is controlled by a light source driver 32 according to control of the controller 18, and illumination directly under the light source 30 is preferably 150 to 200 lux.

In addition, preferably, a water temperature detection sensor (not shown) is installed at the interior of the raising bath 10 according to the present invention. The water temperature detection sensor detects current temperature of the raising water and provides information thereon to the controller 18.

Hereinafter, an ovulation and spawning induction method for freshwater eels according to the present invention using the configuration described above is described.

First, in regard to the raising bath 10, the raising water is set to a fresh water condition by means of the water temperature setting button 16a of the condition setting unit 16, and initial temperature of the raising water is set to 20° C. During a feminization induction period (e.g., 3 to 6 weeks) as a pre-treatment process, temperature is set so as to be gradually increased up to 26° C. In addition, a lighting cycle of the light source 30 is set to 10 hours and controlled by the controller 18. Wild or cultured broodfish with a body length of 30 to 40 cm (or, 2.5 to 3 years) are contained in the raising bath 10.

In this state, the feminization-inducing material (e.g., 17β-estradiol) is fed to the raising water supplied to the raising bath 10 for a predetermined period, whereby a pre-treatment process for feminization is carried out.

During the pre-treatment process according to the present invention, a growth speed promoting step of feeding feed including growth hormone twice or three times a day is included.

Feminization induction of broodfish of freshwater eels subjected to the pre-treatment process is confirmed through a known method. When feminization induction is completed, ovulation and spawning processes are implemented.

That is, in artificial ovulation and spawning processes, the raising water is set to a brackish water condition by means of the water temperature setting button 16a of the condition setting unit 16 and an initial temperature is set to 20° C. A lighting cycle of the light source 30 is set to 8 to 9 hours and controlled by the controller 18.

Accordingly, so that the raising bath 10 has a brackish water zone condition, the controller 18 enables seawater to be supplied to the raising water (in this case, brine is supplied to the cooling unit 28) or brine to be separately supplied to the raising water. The amount of salt in the raising water is gradually increased by 5 psu a day such that the broodfish are adapted to sea water through osmoregulation over a period of about seven days.

Subsequently, fresh water supply to the raising bath 10 is stopped to be set a seawater condition. Finally, a salt concentration is set to reach 35 psu, and the temperature of the raising water is set to be gradually increased from 20±0.5° C. to 16 to 17° C. during ovulation and spawning induction processes.

In addition, FPE is added in an amount of 20 to 120 mg based on 1 kg of the raising water in order to induce ovulation. The amount of FPE added is gradually increased every day according to a lighting cycle of the light source 30.

In addition, sufficient oxygen is supplied to the raising bath 10 and feed is not provided.

Here, an extracted solution homogenized with an Eel Ringer solution, as FPE, is used. While inducing artificial sexual maturation, weight increase is measured per predetermined period (e.g., at interval of five days) and a maturation degree is determined as follows: (WG %, weight gain=[(final body weight−initial body weight)]/initial body weight×100).

During the ovulation induction process of supplying FPE to the raising water, when an ovary maturation state of broodfish with inflated abdomens is sufficient, DHP is added in a concentration of 5 to 10 y/g body weight to the raising water such that natural ovulation is carried out, or DHP is added in a concentration of 2 μg/g body weight to individuals to induce ovulation.

Here, based on the report that freshwater eels spawn before and after the last day of the month, the controller 18 controls such that the light source 30 completely turns off before and after a time point corresponding to the last day of the month.

Meanwhile, male broodfishes are injected with high-concentration HCG (1000 IU/g body weight) when female eels ovulate, and females and males are contained in a ratio of 1:2 in the bath, to induce natural spawning and fertilization.

So as to collect floating eggs of naturally spawned and fertilized eggs through this process, a bath for collecting eggs (not shown) is pipe-connected to the raising bath 10. The collected eggs are subjected to hatching in a hatching bath (not shown) to which a very small amount of oxygen is supplied.

Figure 2:
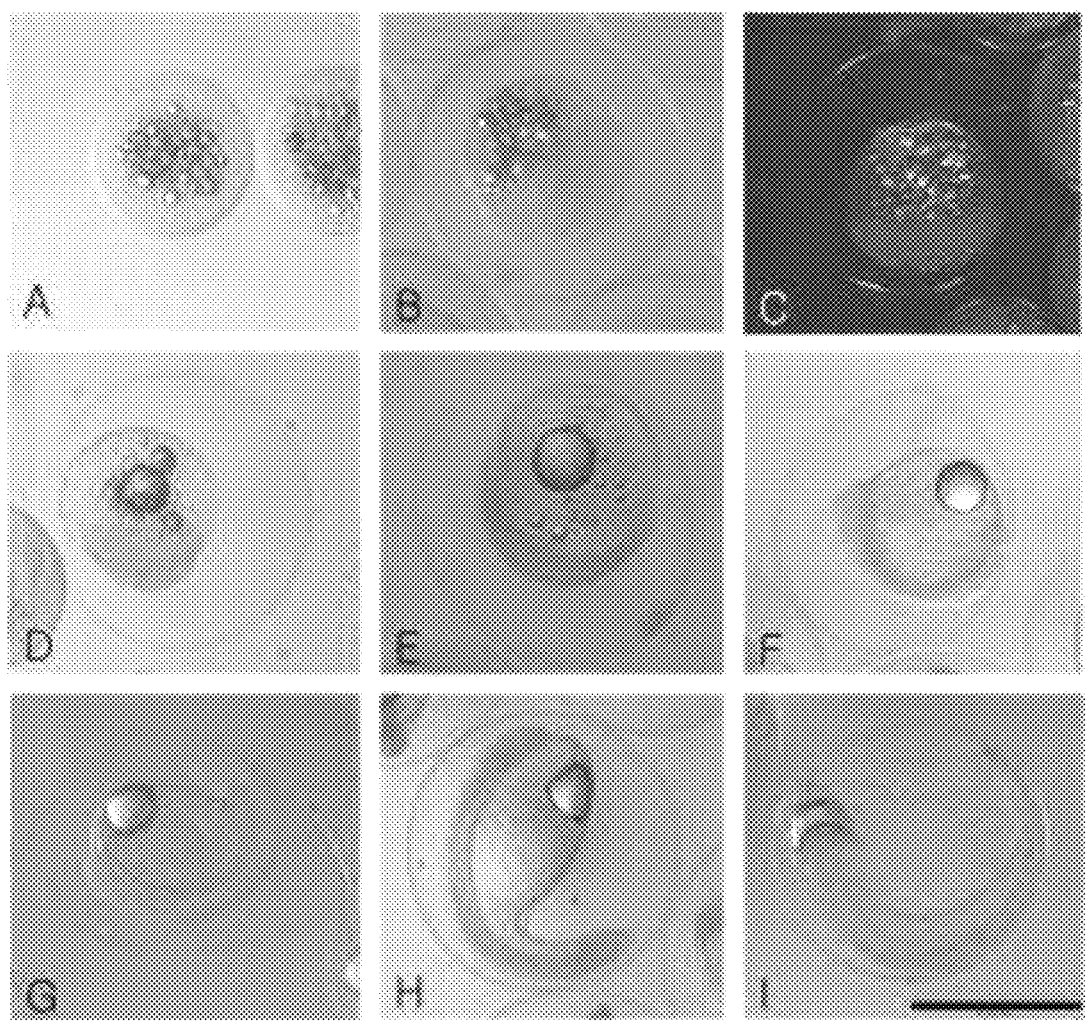
FIG. 2 illustrates morphological characteristics in egg development to describe a method for inducing artificial ovulation and spawning of freshwater eels according to the present invention.

FIG. 2 illustrates morphological characteristics during egg development to describe the method for inducing artificial ovulation and spawning of freshwater eels according to the present invention.

That is, in FIG. 2, "A" illustrates egg yolks of broodfish of freshwater eels and an embryonic development step. In particular, it is observed that division starts from a germinal spot near an animal pole one hour after fertilization, "B" illustrates a four-cell stage state about one and half hours after fertilization (egg diameter: '1.39±0.07 mm), and "C" illustrates 16-cell stages three hours after fertilization.

In addition, referring to "D", a fertilized egg is composed of one large oil droplet and medium and small two or three oil droplets five hours after fertilization, and is observed as being in a blastula stage. Referring to "E", a gastrula stage begins eight hours after fertilization, and a mid-gastrula stage is observed 14 hours after fertilization. At this time, 15 or more small oil droplets are observed near one large oil droplet at the center of an egg.

Referring to "F", embryo formation begins 21 hours after fertilization and oil droplets are fused into one 24 hours after fertilization and thus formation of 12 to 15 myotomes is observed.

In addition, referring to "G", an optic vesicle is formed and a statocyst is observed at a rear part of the optic vesicle, 27 hours after fertilization. 30 hours after fertilization, cardiac morphogenesis is observed under a head, and blood vessels from a heart, surrounding an anterior yolk, are observed. In this case, 24 to 30 myotomes are observed.

Referring to "H", 33 hours after fertilization, 28 to 35 myotomes are observed, a tail is separated from a yolk, a tail shape is formed, and heartbeat can be observed. Referring to "I", 38 hours after fertilization, hatching of penetrating an egg membrane and escaping begins with fierce movement. Directly after the hatching, the body lengths of pre-leptocephalus larbae are about 3 mm, the shapes thereof are slightly curved, and 40 to 44 myotomes are present therein. One hour later, it is observed the body shapes of the larbae are horizontalized.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

That is, a brine tank is additionally provided at the raising bath 10 such that the brine is supplied to the raising bath 10 while controlling the concentration of the brine by means of the controller 18.

The invention claimed is:

1. A method of inducing artificial ovulation and spawning of broodfish of freshwater eels in a raising bath, the method comprising:
    controlling such that fresh water, brackish water and seawater are sequentially supplied to the raising bath,
    inducing feminization and ovary maturation of the broodfish by feeding a feminization-inducing material into the raising bath under a fresh water condition,
    performing osmoregulation of the broodfish by setting raising water in the raising bath to a brackish water condition after the inducing,
    feeding an ovulation induction material collected from catadromous fish to the raising water so as to induce ovulation of the broodfish while setting the raising water in the raising bath to a seawater condition, after the performing, and
    inducing natural spawning after the feeding.

2. The method according to claim 1, wherein the feminization inducing material is 17β-estradiol.

3. The method according to claim 1, wherein, in the inducing feminization and ovary maturation, temperature of the raising water is gradually increased from 20 to 26° C.

4. The method according to claim 3, wherein, in the inducing feminization and ovary maturation, light is turned on per predetermined lighting cycle while increasing the water temperature.

5. The method according to claim 4, wherein the lighting cycle is 8 to 10 hours.

6. The method according to claim 4, wherein the inducing is performed for three to six weeks.

7. The method according to claim 1, wherein the ovulation-inducing substance for inducing the artificial ovulation is extracted from flathead mullet as catadromous fish.

8. The method according to claim 1, wherein, in the performing, a salt concentration is constantly increased by supplying seawater or brine to the raising bath when supply of the fresh water is stopped.

9. The method according to claim 1, wherein, in the feeding and the inducing natural spawning, temperature of the raising water is gradually decreased.

10. The method according to claim 1, wherein, in the feeding and the inducing natural spawning, temperature of the raising water is gradually decreased from 20±0.5° C. to 16 to 17° C.

11. The method according to claim 1, wherein each process of the method is performed in a raising bath apparatus, the raising bath apparatus comprises a raising bath, a heater comprising a heater installed therein so as to provide high-temperature raising water to the raising bath, a cooling unit for supplying low-temperature raising water to the raising bath, a light source installed in the raising bath to periodically turn on light, and a controller for controlling temperature of the raising water and light.

12. The method according to claim 11, wherein a light shade for shading natural light is installed at an upper part of the raising bath, and the light source is disposed under the light shade.

13. The method according to claim 11, wherein the light source illuminates blue light having a wavelength of 400 to 500 nm.

14. The method according to claim 13, wherein an illumination intensity of the light source is 150 to 200 lux.

15. The method according to claim 11, wherein the raising bath apparatus further comprises a heater driver for driving the heater, a lighting driver for driving the light source, a condition setting unit including a water temperature setting button and a light condition setting button, a controlling-data storage unit for storing temperature change cycle data and light irradiation cycle data, and a clocking unit for providing clocking data so as to control temperature change and a light irradiation cycle of the raising water, wherein the temperature change cycle data and the light irradiation cycle data are respectively set by the water temperature setting button and the light condition setting button.

16. The method according to claim 11, wherein a water temperature detection sensor for detecting temperature of raising water and providing information for the temperature to the controller is installed inside the raising bath.

* * * * *